US006194343B1

(12) United States Patent
Collins et al.

(10) Patent No.: US 6,194,343 B1
(45) Date of Patent: Feb. 27, 2001

(54) BRIDGED "TETHERED" METALLOCENES

(75) Inventors: Scott Collins; Jun Tian, both of Waterloo (CA)

(73) Assignee: University of Waterloo, Waterloo (CA)

( * ) Notice: Subject to any disclaimer, the term of this patent is extended or adjusted under 35 U.S.C. 154(b) by 0 days.

(21) Appl. No.: 09/266,562

(22) Filed: Mar. 11, 1999

(51) Int. Cl.[7] .................................................. B01J 31/00
(52) U.S. Cl. .................. 502/158; 502/152; 502/155; 502/159; 526/943
(58) Field of Search ................................ 502/152, 154, 502/158

(56) References Cited

U.S. PATENT DOCUMENTS

| | | | |
|---|---|---|---|
| 4,668,650 | 5/1987 | Lo et al. | 501/111 |
| 4,701,432 | 10/1987 | Welborn, Jr. | 502/113 |
| 4,900,706 | 2/1990 | Sasaki et al. | 502/116 |
| 5,202,398 | 4/1993 | Antberg et al. | 526/129 |
| 5,264,506 | 11/1993 | Eisinger et al. | 526/194 |
| 5,422,325 | 6/1995 | Jejelowo et al. | 502/104 |
| 5,610,115 | * 3/1997 | Soga et al. | 502/152 |
| 5,616,665 | 4/1997 | Jejelowo et al. | 526/129 |
| 5,627,246 | * 5/1997 | Langhauser et al. | 502/125 |
| 5,747,404 | * 5/1998 | Nagy et al. | 502/152 |
| 5,789,333 | * 8/1998 | Angelici et al. | 502/155 |
| 5,807,938 | * 9/1998 | Kaneko et al. | 502/152 |
| 5,824,620 | 10/1998 | Vega et al. | 502/117 |
| 5,846,895 | * 12/1998 | Gila et al. | 502/120 |
| 5,861,352 | * 1/1999 | Gila et al. | 502/155 |
| 5,939,347 | * 8/1999 | Ward et al. | 502/152 |

FOREIGN PATENT DOCUMENTS 0 293 815 * 12/1988 (EP) .
37 18 888 * 12/1988 (DE) .

OTHER PUBLICATIONS

Synthesis, Structural Characterization, and Electrochemistry of [1]Metallocenophane Complexes, [Si(alkyl)$_2$(C$_5$H$_4$)$_2$] MCL$_2$, M=Ti, Zr, C. S. Bajgur, W. R. Tikkanen, and J.L. Petersen, Inorg. Chem. 1985, 24, 2539–2546.

Quaternary Onlum Hexachloroplatinates: Novel Hydrosllylation Catalysts, I.G. Iovel, Y.Sh. Goldberg, M. V. Shymanska, and Edmunds Lukevics, Organometallics 1987, 6, 1410–1413.

* cited by examiner

Primary Examiner—Mark L. Bell
Assistant Examiner—J. Pasterczyk
(74) Attorney, Agent, or Firm—Kenneth H. Johnson

(57) ABSTRACT

The present invention provides a tethered bridged metallocene compound in which the tether typically comprises a segment of the formula $-(R^2)_d-(CH_2CH_2)_e(CH=CH)_f$ wherein $R^2$ is an alkylene or phenylene group, and d, e and f are 1 or 0. One end of the tether reacts with a silane bridged metallocene compound and the other reacts with the support. The activated metallocene compound is capable of producing a polymer having a narrow molecular weight distribution.

44 Claims, No Drawings

BRIDGED "TETHERED" METALLOCENES

FIELD OF THE INVENTION

The present invention relates to supported single site catalysts. More particularly the present invention relates to novel processes for preparing novel single site, ansa-metallocene catalysts which are "tethered" or bridged to the support though a disilyl- or silyl-alkyl bridge.

BACKGROUND OF THE INVENTION

Single site or metallocene or constrained geometry type catalysts are well known. Typically such catalysts comprise a transition metal such as titanium, zirconium or hafnium having at least one group which is activated by a cocatalyst, such as a halide group or an alkyl or alkoxy radical, and at least one aromatic ligand such as cyclopentadienyl or indenyl which is typically bridged to another group such as another aromatic ligand or an amine.

Some polymerization techniques require a supported catalyst. Fairly early on it was found that metallocene type catalysts could be supported on inorganic supports which had reactive hydroxyl groups such as silica. The metallocene type catalyst was brought into contact with the surface of the support. The metallocene catalyst was either deposited upon or reacted with the support. An example of such is U.S. Pat. No. 4,701,432 issued Oct. 20, 1987 to Welborn, Jr. assigned to Exxon Chemical Patents Ltd. The Welborn patent suggests a direct reaction between the catalyst and the support surface and does not seem to contemplate any significant spacing between the metallocene catalyst and the support.

A further stage in the development of supported catalysts was the deposition or reaction of a metallocene catalyst with a support which contained a cocatalyst already supported on the surface. This could have been by adsorption or by reaction of a cocatalyst such as an aluminum alkyl or an aluminoxane with the support surface or by more interesting means such as generating aluminoxane in situ by reacting aluminum alkyls in the presence of small amounts of water. Representative of this type of art are U.S. Pat. No. 5,422,325 issued Jun. 6, 1995 and U.S. Pat. No. 5,616,665 issued Apr. 1, 1997 both in the name of Jejelowo et al, assigned to Exxon Chemical Patents, Inc. This art teaches an indirect support as the catalyst reacts with the aluminum compound deposited upon the support.

U.S. Pat. No. 5,202,398 issued Apr. 13, 1993 to Antberg et al, assigned to Hoechst Aktiengesellsdchaft teaches reacting a metallocene type catalyst with a support having reactive hydroxyl groups. The patent teaches that in the catalysts at least one of the aromatic rings is substituted with a radical terminating in a silyl ether. The ether is said to react with the surface hydroxyl groups of the supports and the catalyst becomes bound to the support through a bond between the oxygen on the support and the silicon in the now silyl terminated radical attached to an aromatic ligand in the metallocene catalyst. The resulting catalyst is said to be a metallocene catalyst "tethered" to but spaced distant from a support.

It is obvious from the teachings of U.S. Pat. No. 4,701,432 that this type of metallocene catalyst could also directly react with the hydroxylated support (via reaction of e.g. the ZrCl bond in a metallocene catalyst with surface OH groups) and the resulting supported, metallocene catalyst would not be "tethered" as described in U.S. Pat. No. 5,202,398.

U.S. Pat. No. 5,202,398 does not exemplify that such "tethered" metallocene catalysts are single-site, forming polymers with a narrow molecular weight distribution, as in the present invention. In fact, as exemplified in the present patent application, this patent leads to supported metallocene catalysts which are multi-site, producing polymers with a broad and multi-modal molecular weight distribution. U.S. Pat. No. 5,202,398 does not teach how a bridged metallocene catalyst can be "tethered" to a support in an optimal manner as described in the present invention. Finally, U.S. Pat. No. 5,202,398 does not describe the reaction processes of the present invention which are necessary to carry out the "tethering" reaction in an optimal manner.

U.S. Pat. No. 5,824,620 issued Oct. 20, 1998 assigned to Repsol Quimica S.A. teaches a similar catalyst to that of U.S. Pat. No. 5,202,398. The support is either hydroxylated or the hydroxylated support is treated with a silylating agent terminating in group selected from e.g. a hydroxyl, amino, or thiol group which reacts with a metallocene functionalized with e.g. a halogen atom. Again, such reactive groups on the support could react directly with the Zr—Cl bonds of the metallocene catalyst and the resulting supported, metallocene catalyst would not be "tethered" as described in U.S. Pat. No. 5,824,620. U.S. Pat. No. 5,824,620 does not teach how a bridged metallocene catalyst can be "tethered" to a support in an optimal manner as described in the present invention. Finally, U.S. Pat. No. 5,824,620 does not describe the reaction processes of the present invention which are necessary to carry out the "tethering" reaction in an optimal manner.

SUMMARY OF THE INVENTION

The present invention provides a supported "tethered" single site bridged metallocene catalyst selected from the group consisting of catalysts of the formula:

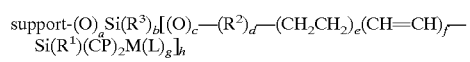

wherein the support is a support having reactive surface OH groups, M is a transition metal, $R^1$ is selected from the group consisting of a $C_{1-4}$ alkyl radical and a phenyl radical, which may be up to fully substituted with $C_{1-4}$ alkyl radicals, $R^2$ is selected from the group consisting of a $C_{1-20}$ alkylene radical and a phenylene radical, $R^3$ is selected from the group consisting of a halogen atom, a $C_{1-4}$ alkyl radical, a $C_{1-4}$ alkoxy radical, a phenyl radical and an amino radical of the formula $N(R^4)_2$ wherein $R^4$ is a $C_{1-4}$ alkyl radical, a is an integer from 1 to 3, b is 0, 1, 2 or 3, and h is an integer from 1 to 3 and a+b+h=4 and if h is 1, then a+b=3 and a is 1 to 3, and if h is 2, a+b=2 and a is 1 or 2 and if h is 3, a=1 and b=0, c is 0 or 1 and d is 0 or 1 provided if c=0, d is 0 or 1 and if c=1 d=1, e is 0 or 1, f is 0 or 1 and the sum of e+f=1, Cp is a $C_{5-13}$ cyclic or bi-cyclic ligand having delocalized bonding within the ring and being bound to M through covalent $\eta^5$-bonds which ligand is unsubstituted or may be up to fully substituted by a substituent selected from the group consisting of a halogen atom, $C_{1-4}$ alkyl radicals, a phenyl radical and an amino radical which is substituted by two $C_{1-4}$ alkyl radicals, each L is independently an activatable ligand and the sum of 2 +g is equal to the oxidation state of M; and a catalyst of the formula:

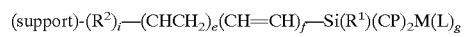

wherein the support is a polymer without surface hydroxyl groups and $R^1$, $R^2$, Cp, M, L, e, f and g are as defined above and i is 0 or 1.

The present invention further provides a process for preparing the above "tethered" catalyst reacting either:

(a) a support selected from the group consisting of:
(i) supports of the formula:

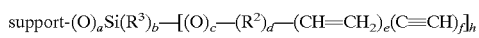

wherein the support has reactive surface hydroxyl groups, $R^3$ is selected from the group consisting of a halogen atom, a $C_{1-4}$ alkyl radical, a $C_{1-4}$ alkoxy radical, a phenyl radical and an amino radical of the formula $N(R^4)_2$ wherein $R^4$ is a $C_{1-4}$ alkyl radical, a is an integer from 1 to 3, b is 0, 1, 2 or 3, and h is an integer from 1 to 3 and a+b+h=4 and if h is 1, then a+b=3 and a is 1 to 3, and if h is 2, a+b=2 and a is 1 or 2 and if h is 3, a=1 and b=0, c is 0 or 1 and d is 0 or 1 provided if c=0, d is 0 or 1 and if c=1d=1, e is 0 or 1, f is 0 or 1 and the sum of e+f=1; and (ii) supports of the formula:

wherein the support is a polymer having no reactive surface hydroxyl groups and $R^2$, e and f are as defined above and i is 0 or 1;

with a bridged metallocene catalyst containing in the bridging group an SiH bond reactive with the terminal unsaturation pendant from the support; or (b) a bridged metallocene catalyst substituted in the bridging group by a pendant radical of the formula $(CH_2=CH)_e(HC\equiv C)_f(R^2)_d$ wherein $R^2$ is selected from the group consisting of $C_{1-20}$ alkylene radicals and a phenylene radical, d is 0 or 1, e is 0 or 1, f is 0 or 1 and the sum of e+f=1 with a support containing surface SiH groups reactive with the terminal unsaturation of the pendant radical substituted on the bridging group of the bridged metallocene catalyst; in an inert solvent at a temperature from 0° C. to 100° C., in the presence of a hydrosilylation catalyst in the amounts from 0.1 up to 10 mol % based on the molar amount of the unsupported metallocene or constrained geometry complex.

In a further embodiment the present invention provides a process for the polymerization of one or more $C_{2-12}$ alpha olefins in the presence of the above "tethered" catalyst and an activator at a temperature from 20° C. to 250° C.; and at a pressure from 15 to 15000 psi.

DETAILED DESCRIPTION

The catalysts of the present invention are typically transition metal catalysts, preferably early transition metal catalysts. Most preferably, the transition metals are selected from the group consisting of Ti, Hf and Zr.

The support in accordance with the present invention may be any support which contains a reactive surface group. Typically the support may be selected from the group consisting of silica and polymeric supports having a residual unsaturation, either introduced through some functionalization reaction in the case of silica or already present in the case of polymeric supports. Alternatively, the support may have a surface hydrogen atom reactive with the terminally unsaturated radical pendant from the metallocene bridge. Preferably, the support is silica having SiH groups chemically bonded to the support which are introduced through some functionalization reaction.

A number of silica supports are disclosed in the art. One particularly useful silica is Davidson 958 described in U.S. Pat. No. 5,264,506 to Eisinger et al assigned to Union Carbide Chemicals & Plastics Technology Corporation and U.S. Pat. No. 4,668,650 to Lo et al assigned to Mobil Oil Corporation. There are many known reactions for the functionalization of silica; examples include silylation, chlorination, tosylation and the like. Any of these functionalization reactions could be used to prepare "tethered" catalysts according to the present invention, providing that in the process of carrying out such functionalization reactions or in a subsequent reaction involving the functionalized silica support, a radical is introduced which possesses residual unsaturation such as a C=C or C≡C bond.

An alternative and equally useful approach, as exemplified in the present invention, is the reaction of a functionalized silica, bearing SiH groups with a metallocene type catalyst bearing a radical containing residual unsaturation.

The support may also be a polymeric support. Suitable supports are described for example in U.S. Pat. No. 4,900,706 assigned to Sumitomo. Typically the polymeric support may be a cross-linked polystyrene containing from about 10 to 50 weight % of a cross linking agent such a divinyl benzene. In this case, the residual unsaturation is already present in the polymeric product and does not need to be subsequently introduced.

Typically, the support will have a small particle size from about 0.1 to 500, preferably from about 20 to 200 microns. The support should have a large surface area of at least about 20 m²/g, preferably from about 50 to 1500 m²/g. The support should have a porosity of at least about 0.2 cm³/g, preferably at least 0.5 cm³/g.

The catalyst is "tethered" to the support by a radical anchored to the support through a Si atom when the support contains surface reactive hydroxyl groups. The support could be silica or it could be polymeric having surface reactive hydroxyl groups.

If there are sufficiently closely spaced reactive hydroxyl groups more than one reactive hydroxyl group may react with the silicon atom which forms part of the tether. Hence in the formula:

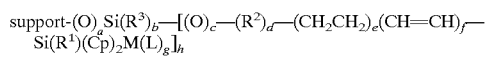

the subscript a may be an integer from 1 to 3. For example, if the hydroxyl groups are sufficiently far apart a may be 1 indicating only one surface hydroxyl is reacting with the silyating agent. However, if there are many closely spaced surface hydroxyl groups, two or three hydroxyls may react with the silyating agent.

In the above formula b may be 0, 1, 2 or 3. Correspondingly, h may be 1, 2 or 3 and the sum of a+b+h=4. If his 1, 2 or 3 then a+b=3, 2 or 1 respectively; b may be 0, 1 or 2 and a may be 1, 2 or 3.

In the above formula, $R^1$ is selected from the group consisting of a $C_{1-4}$ alkyl radical and a phenyl radical, which may be up to fully substituted with $C_{1-4}$ alkyl radicals, $R^2$ is selected from the group consisting of a $C_{1-20}$ alkylene radical, preferably a $C_{1-10}$ alkylene radical and a phenylene radical and $R^3$ is selected from the group consisting of a halogen atom, a $C_{1-4}$ alkyl radical, a $C_{14}$ alkoxy radical, a phenyl radical, and an amino radical of the formula $N(R^4)_2$ wherein $R^4$ is a $C_{14}$ alkyl radical. Each L is independently an activatable ligand, preferably selected from the group consisting of a halogen atom, a $C_{1-4}$ alkyl group or a $C_{1-4}$ alkoxy group. Cp is a $C_{5-13}$ cyclic or bi-cyclic ligand having delocalized bonding within the ring and being bound to M through covalent $\eta^5$-bonds which ligand is unsubstituted or may be up to fully substituted by a substituent selected from the group consisting of a halogen atom, $C_{1-4}$ alkyl radicals, a phenyl radical and an amino radical which is substituted by two $C_{1-4}$ alkyl radicals. Preferably, Cp is selected from the group consisting of cyclopentadienyl, indenyl and fluorenyl ligands which are unsubstituted or up to fully substituted by a $C_{1-4}$ alkyl radical or an amino radical which is substituted by two $C_{1-4}$ alkyl radicals.

In the catalyst, c may be 0 or 1, and d may be 0 or 1 provided that if c=1, d=1 (i.e. c=0 and d=0 or 1; c=1 and d=1). Additionally, e is 0 or 1 and f is 0 or 1 but e and f are dependent so that the sum of e+f=1 (e.g. there is only one terminal unsaturation on the tether—either vinyl or acetylenic (which upon the reaction with the support uses one of the unsaturations). The values for c, d, e and f may be used in any combination within the above teaching.

In a preferred embodiment of the invention h is 1 and the formula becomes:

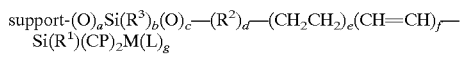

support-$(O)_aSi(R^3)_b(O)_c$—$(R^2)_d$—$(CH_2CH_2)_e(CH=CH)_f$—$Si(R^1)(CP)_2M(L)_g$ wherein a, b, c, d, e, f, g, $R^1$, $R^2$ and $R^3$ are as defined above. When the support is a polymer, the radical on the support does not have to contain a Si atom. The catalyst would then have the formula:

(support)-$(R^2)_i$—$(CHCH_2)_e(CH=CH)_f$—$Si(R^1)(CP)_2M(L)_g$ wherein i is 0 or 1 and e, f, g, $R^1$ and $R^2$ are as defined above.

In the above catalysts, it should be noted that when $R^2$ contains a 1,4-phenylene radical, a "stiffer" tether is provided which is not as flexible as the alkyl radical.

The metallocene catalyst portion is bridged. That is, the Cp groups are joined by a bridge containing a silicon atom bearing the radical $R^1$. The catalyst contains the structure $(R^1)SiCp_2ML_g$ wherein the tether —$(R^2)$—$(CHCH_2)_e$—$(CH=CH)_f$ is attached to the active catalytic structure through the Si atom. Preferably, M is selected from the group consisting of Ti, Zr and Hf.

In the above catalyst, the bridging group may be $(R^1)$—SiH—, the hydrogen atom being reactive with the —$(R^2)_i$—$(CH=CH_2)_e$—$(C\equiv CH)_f$ radical on the support to form the tether or the bridging group may be $(R^1)$—Si—$(R^2)$—$(CH=CH_2)_e$—$(C\equiv CH)_f$ wherein $R^1$, $R^2$, e and f are as defined above. When the bridging group has a pendant hydrogen the support has a reactive group with a terminal unsaturation and wherein the bridge has a pendant radical with a terminal unsaturation the support has a reactive surface SiH group.

The "tethered" supported catalysts may be prepared by the above process. When process (a) described above is used the metallocene component has a bridging group containing an H—Si bond and the support has a pendant radical with a terminal unsaturation. If the support has reactive surface hydroxyl radicals the support may have the formula:

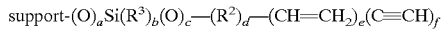

support-$(O)_aSi(R^3)_b(O)_c$—$(R^2)_d$—$(CH=CH_2)_e(C\equiv CH)_f$ wherein $R^3$ is selected from the group consisting of a halogen atom, a $C_{1-4}$ alkyl radical, a $C_{1-4}$ alkoxy radical, a phenyl radical and an amino radical of the formula $N(R^4)_2$ wherein $R^4$ is a $C_{1-4}$ alkyl radical, a is an integer from 1 to 3, b is 0, 1, 2 or 3, and the sum of a+b=3, $R^2$ is selected from the group consisting of a $C_{1-20}$ alkylene radical and a phenylene radical, e is 0 or 1, f is 0 or 1 and the sum of e+f=1, c is 0 or 1 and d is 0 or 1, provided if c=1, d=1 and if c=0, d can be 0 or 1.

If the support is polymeric and does not have reactive surface hydroxyl groups it may have the formula:

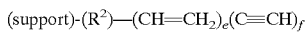

(support)-$(R^2)_i$—$(CH=CH_2)_e(C\equiv CH)_f$ wherein the support is a polymer having no reactive surface hydroxyl groups and $R^2$, e and f are as defined above and i is 0 or 1.

In the above processes, the bridged metallocene component preferably has the formula $(R^1)SiH(Cp)_2ML_g$ wherein M is selected from the group consisting of Ti, Hf or Zr, $R^1$ is a $C_{1-4}$ alkyl or phenyl radical which is unsubstituted or substituted by up to four $C_{1-4}$ alkyl radicals, Cp is a $C_{5-13}$ cyclic or bi-cyclic ligand having delocalized bonding within the ring and being bound to M through covalent $\eta^5$-bonds which ligand is unsubstituted or may be up to fully substituted by one or more substituents selected from the group consisting of a halogen atom, $C_{1-4}$ alkyl radicals, a phenyl radical and an amino radical which is unsubstituted or substituted by up to two $C_{1-4}$ alkyl radicals, L is an activatable ligand and 2+g=the oxidation state of M.

In an alternate procedure, the "tethered" metallocene catalyst may be prepared by reacting a bridged metallocene catalyst substituted in the lo bridging group by a pendant radical of the formula $(CH_2=CH)_e(HC\equiv C)_f(R^2)_d$ wherein $R^2$ is selected from the group consisting of $C_{1-20}$ alkylene radicals and a phenylene radical, d is 0 or 1, e is 0 or 1, f is 0 or 1 and the sum of e+f=1 with a support containing surface hydrogen atoms, such as SiH, reactive with the terminal unsaturation of the pendant radical substituted on the bridging group of the bridged metallocene catalyst. Preferably the support is silica containing surface SiH groups.

In a preferred embodiment of the preceding process, the silica may be treated with a compound of the formula $(R^5)_j(Z)_kSiH$ wherein j+k=3, j is an integer and k=1, 2 or 3, $R^5$ is a $C_{1-4}$ alkyl or phenyl radical which is unsubstituted or substituted by up to four $C_{1-4}$ alkyl radicals and Z is a halogen atom, a $C_{1-4}$ alkoxy group or an amino radical of the formula $N(R^4)_2$ wherein $R^4$ is a $C_{1-4}$ alkyl radical. It should be noted that the Si—Z bonds are reactive towards surface hydroxyl groups and at least one of them reacts with a surface hydroxyl group or if there are other surface hydroxy groups nearby, up to all three of the Si—Z groups may react.

In the above process, preferably the bridged metallocene has the formula $(CH_2=CH)_e(HC\equiv C)_f(R^2)_dSi(R^1)(CP)_2ML_g$ wherein M is selected from the group consisting of Ti, Hf or Zr, $R^1$ is a $C_{1-4}$ alkyl or a phenyl radical which is unsubstituted or substituted by up to four $C_{1-4}$ alkyl radicals, Cp is a $C_{5-13}$ cyclic or bi-cyclic ligand having delocalized bonding within the ring and being bound to M through covalent $\pi$ bonds which ligand is unsubstituted or may be up to fully substituted by one or more substituents selected from the group consisting of a halogen atom, a $C_{1-4}$ alkyl radical, a phenyl radical and an amino radical which is substituted by two $C_{1-4}$ alkyl radicals, $R^2$ is selected from the group consisting of a $C_{1-20}$ alkyl radical or a phenylene radical, d is 0 or 1, e is 0 or 1, f is 0 or 1 and the sum of e+f=1.

Both of the above processes for forming the supported "tethered" metallocene may be carried out in an inert solvent at a temperature from 20° C. to 100° C., most preferably from 0° C. to 100° C. in the presence of a hydrosilylation catalyst in the amounts from 0.1 up to 10 mol % based on the molar amount of the unsupported metallocene or constrained geometry complex. The hydrosilyation catalyst should be based on a transition metal, preferably a metal selected from the group consisting of Ru, Os, Rh, Ir, Ni, Pd and Pt.

The reaction is conducted in an inert solvent in which the hydrosilylation catalyst and metallocene catalyst are soluble.

Suitable examples include halogenated alkane, dialkyl ether or aromatic hydrocarbon solvents.

The catalysts of the present invention may be used in olefin polymerizations, preferably slurry or solution phase olefin polymerization. The polymerization may be conducted at temperatures from about 20° C. to about 250° C. Depending on the product being made, this temperature may be relatively low-such as from 20° C. to about 180° C. as in the slurry process or from 180° C. to 250° C. as in the solution process. The pressure of the reaction may be as high as about 15,000 psig for the older high pressure processes or may range from about 15 to 4,500 psig.

In a solution polymerization, the monomers are dissolved/dispersed in the solvent either prior to being fed to the reactor, or for gaseous monomers, the monomer may be fed to the reactor so that it will dissolve in the reaction mixture. Prior to mixing, the solvent and monomers are generally purified to remove polar moieties. The polar moieties or catalyst poisons include water, oxygen, metal impurities, etc. Preferably, steps are taken before provision of such into the reaction vessel, for example, by chemical treatment or careful separation techniques after or during the synthesis or preparation of the various components. The feedstock purification prior to introduction into the reaction solvent follows standard practices in the art (e.g. molecular sieves, alumina beds and oxygen removal catalysts) are used for the purification of ethylene, alpha-olefin and optional diene. The solvent itself as well (e.g. cyclohexane and toluene) is similarly treated. In some instances, out of an abundance of caution, excess scavenging activators may be used in the polymerization process.

The catalyst of the present invention may be activated with a number of types of activators. The activator may be selected from the group consisting of:

(i) an aluminoxane; and (ii) an activator capable of ionizing the catalyst (which may be used in combination with an alkylating agent).

The aluminoxane activator may be of the formula $(R^6)_2AlO(R^6AlO)_mAl(R^6)_2$ wherein each $R^6$ is independently selected from the group consisting of $C_{1-20}$ hydrocarbyl radicals, m is from 0 to 50 and preferably $R^6$ is a $C_{1-4}$ alkyl radical and m is from 5 to 30. The aluminoxane activator is added to the supported catalyst and the combination is then used in olefin polymerization.

If the catalyst is activated only with aluminoxane, the amount of aluminoxane will depend on the reactivity of the alkylating agent. Activation with aluminoxane generally requires a molar ratio of aluminum in the activator to the transition metal in the catalyst from 50:1 to 1000:1. MAO may be the higher end of the above noted range.

The activator of the present invention may be a combination of an alkylating agent (which also serves as a scavenger), other than aluminoxane, in combination with an activator capable of ionizing the catalyst.

The alkylating agent (which may also serve as a scavenger) may be selected from the group consisting of: $(R^7)_ngX_{2-n}$ wherein X is a halide, each $R^7$ is independently selected from the group consisting of $C_{1-10}$ alkyl radicals, preferably $C_{1-8}$ alkyl radicals and n is 1 or 2; $R^7Li$ wherein $R^7$ is as defined above; $(R^7)_pZnX_{2-p}$ wherein $R^7$ is as defined above, X is halogen and p is 1 or 2; $(R^7)_qAlX_{3-q}$ wherein $R^7$ is as defined above, X is halogen and q is an integer from 1 to 3. Preferably in the above compounds $R^7$is a $C_{1-4}$ alkyl radical and X is chlorine. Commercially available compounds include triethyl aluminum (TEAL), diethyl aluminum chloride (DEAC), dibutyl magnesium ($(Bu)_2Mg$), dimethyl magnesium ($Me_2Mg$) and butyl ethyl magnesium (BuMgEt).

The activator capable of ionizing the transition metal catalyst may be selected from the group consisting of:

(i) compounds of the formula $[R^8]^+[B(R^9)_4]^-$ wherein B is a boron atom, $R^8$ is a cyclic $C_{5-7}$ aromatic cation or a triphenyl methyl cation and each $R^9$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom and a silyl radical of the formula —Si—$(R^{10})_3$ wherein each $R^{10}$ is independently selected from the group consisting of a hydrogen atom and a $C_{1-4}$ alkyl radical; and (ii) compounds of the formula $[(R^{11})_r(R^{12})_sZH]^+[B(R^9)_4]^-$ wherein B is a boron atom, H is a hydrogen atom, Z is a nitrogen atom or phosphorus atom, i is 2 or 3 and r+s=3, $R^{11}$ is selected from the group consisting of $C_{1-8}$ alkyl radicals, $R^{12}$ is a phenyl radical which is unsubstituted or substituted by up to three $C_{1-4}$ alkyl radicals and $R^9$ is as defined above; and (iii) compounds (activators) of the formula $B(R^9)_3$ wherein $R^9$ is as defined above.

In the above compounds, preferably $R^9$ is a pentafluorophenyl radical, $R^8$ is a triphenylmethyl cation, Z is a nitrogen atom, $R^{11}$ is a $C_{1-4}$ alkyl radical and $R^{12}$ is a phenyl radical which is substituted by two $C_{1-4}$ alkyl radicals.

The activator capable of ionizing the transition metal catalyst abstracts one or more L ligands so as to ionize the transition metal center into a cation, but not to covalently bond with the transition metal, and to provide sufficient distance between the ionized transition metal and the ionizing activator to permit a polymerizable monomer to enter the resulting active site.

Readily commercially available activators which are capable of ionizing the transition metal catalysts include: N,N-dimethylanilium tetrakispentafluorophenylborate; triphenylmethylium tetrakispentafluorophenylborate; and trispentafluorophenyl boron.

If the transition metal catalyst is activated with a combination of an aluminum alkyl compound (generally other than aluminoxane), and a compound capable of ionizing the transition metal catalyst (e.g. activators (i) and (iii) above), the molar ratios of transition metal:metal in the alkylating agent (e.g. Al); metalloid (e.g. boron) in the activator capable of ionizing the transition metal catalyst may range from 1:1:1 to 1:100:5. Preferably, the alkylating agent is premixed/reacted with the transition metal catalyst and the resulting alkylated species is then reacted with the activator capable of ionizing the transition metal catalyst.

Suitable monomers may be olefin monomers including ethylene and $C_{3-20}$ mono and di-olefins. Preferred monomers include ethylene and $C_{3-12}$ alpha olefins which are unsubstituted or substituted by up to two $C_{1-6}$ alkyl radicals. Illustrative, non-limiting examples of such alpha olefins are one or more of propylene, 1-butene, 1-pentene, 1-hexene, 1-octene and 1-decene. The reaction product of the present invention may also be a co- or homo-polymer of one or more alpha olefins.

The polyethylene polymers which may be prepared in accordance with the present invention typically comprise not less than 60, preferably not less than 70, most preferably not less than 80 weight % of ethylene and the balance of one or more $C_{4-10}$ alpha olefins, preferably selected from the group consisting of 1-butene, 1-hexene and 1-octene.

The feedstock may be heated prior to feeding into the reactor. However, in many instances it is desired to remove heat from the reactor so the feedstock may be at ambient temperature to help cool the reactor.

The present invention will now be illustrated by the following examples in which unless otherwise specified weight means weight % and parts means parts by weight (e.g. grams).

General Experimental

All chemicals were reagent grade and purified as required. Diethyl ether, dichloromethane, tetrahydrofuran, hexane and toluene used in organometallic reactions and polymerizations were all dried and deoxygenated by passing through activated La Roche A2 alumina (12×32 mesh) and Engelhard Q-5 catalyst under nitrogen. Air-sensitive compounds were prepared and handled using standard Schlenk techniques and stored in glove boxes. All experiments were performed under a nitrogen atmosphere unless indicated otherwise. Chlorosilanes were purchased from commercial sources and distilled from $CaH_2$ prior to use. Methylaluminoxane (PMAO*Tol-781) and modified methylaluminoxane (MMAO-7) were obtained from Akzo Chemicals Ltd. and the former was concentrated in vacuo to dryness ($10^{-3}$m Hg) to provide solid MAO for subsequent use. Cyclopentadienyl sodium, $CH_2=CH(CH_2)_8CH_2OH$, $[Ph_3C][B(C_6F_5)_4]$, $Zr(NMe_2)_4$, $Bu_2Mg$ and $Me_2Mg$ were purchased from commercial sources while $(Bu_4N)_2PtCl_6$ was synthesized according to Iovel, I. G. et al in *Organometallics*, 1987, 6, 1410 and $Me_2SiCp_2ZrCl_2$ and $Me_2SiCp_2ZrMe_2$ were synthesized according to Bajgur, C. S. et al in *Inorganic Chemistry*, 1985, 24, 2539.

Silica, available from Quantum Chemical under the designation of PQ 3010, having a surface area of 440 $m^2/g$ and a pore volume of 3.10 $cm^3/g$ with an average pore radius 144 Å was used as a support. Unless indicated otherwise, the silica used was washed with deionized water at room temperature, dried at 80° C. under vacuum to constant weight, heated in a quartz tube inside a horizontal tube furnace to 500–600° C. for 4 hours under oxygen flow and then cooled down to room temperature under oxygen flow to produce partially dehydroxylated silica (PDS). The hydroxyl group content was determined by titration with trimethylaluminum and the content was 78.0 mmol OH/mol support. $SiO_2.MAO$ was purchased from Witco GmbH (TA-02794) and had an aluminum content of 24.1 weight % as determined by measuring the evolved methane through hydrolysis. The silica used for the $SiO_2.MAO$ was PQ MS 3040, sieved 532 mesh.

Cross-linked poly(styrene-divinylbenzene) with divinylbenzene (DVB) content of 12 and 50 weight % were purchased from Polyscience, Inc. The resins used were washed to remove surface impurities. The following solutions were used at 60° C. with, in each case, a contact time of 45 minutes with the resins: 1 N NaOH, 1 N HCl, 1 N NaOH-dioxane (1:2), 2 N HCl-dioxane (1:2), $H_2O$, dimethylformamide. The resins were then washed at room temperature with the following: 2 N HCl in methanol (1:2), $H_2O$, methanol, methanol-dichloromethane (1:3) and methanoldichloromethane (1:10). The resins were then dried under reduced pressure using a modified Abderhalden vessel under refluxing hexane for at least 36 hours. In general, the washing steps were accompanied by a weight loss of up to 25%. To remove trace water, small amounts of resin were treated with excess trimethylchlorosilane ($ClSiMe_3$) in dichloromethane. The double bond contents for 12 and 50 weight % DVB resins were 0.188 mmol/g and 1.619 mmol/g determined by bromine/iodometric titration.

Synthesis of Metallocene Complexes 1.1 Synthesis of $Me(H)SiCp_2ZrCl_2$ (1)

1.1.1 Preparation of bis(cyclopentadienyl)methylsilane—$HMeSi(CpH)_2$ (2)

Methyldichlorosilane (8.62 g, 75 mmol) in 80 mL of diethyl ether was cooled to −78° C. Cyclopentadienylsodium (13.2 g, 150 mmol) dissolved in 100 mL tetrahydrofuran was slowly added over a period of 3 hours. During the addition, a light yellow solution was obtained and LiCl precipitated. The solution was left to warm to room temperature with continuous stirring. The suspension was centrifuged and filtered. The final product was obtained as a viscous, clear yellow oil (12.3 g, 92%) as a mixture of three stereoisomers following removal of the solvents under reduced pressure. The compound was used without purification in the next reaction. $^1$H NMR (250 MHz, $CDCl_3$, 25° C.): δ −0.22 (d, J=3 Hz, $CH_3$), 0.12 (d, J=4 Hz, $CH_3$), 0.20 (d, J=3 Hz, $CH_3$), 3.07 (br, allylic $CH_2$), 3.49 (br, allylic CH), 4.08 (d, J=5 Hz, allylic $CH_2$), 4.74 (m, SiH), 6.15 7.00 (m, vinylic CH).

1.1.2 Preparation of $Me(H)SiCp_2ZrCl_2$ via Amine Elimination

The ligand, $HMeSi(CpH)_2$ (3.14 g, 17.8 mmol), dissolved in 80 mL of toluene was cooled to −78° C. and then cannulaed into a solution of $Zr(NMe_2)_4$ (4.78 g, 17.8 mmol) in 80 mL of toluene at −78° C. within 5 minutes with vigorous stirring. The mixture was slowly warmed to ambient temperature (~2.5 hours) and stirred for an additional 3 hours, during which a color change was observed from light yellow to orange. The solvent was removed in vacuo with slight warming of the solution in a water bath (ca. 40–50° C.). The orange residue was transferred into the glove box and 25 mL of hexane was added. The slurry was cooled to −35° C., filtered and washed with cold hexane. The second crop of pure complex was obtained from filtrate by reducing the volume under vacuum with total yield of 5.24 g (84%). $^1$H NMR (250 MHz, $C_6D_6$, 25° C.): δ 0.40 (d, J=4 Hz, 3H, $SiCH_3$), 2.73 (d, J=2 Hz, 6H, $N(CH_3)_2$), 4.98 (q, J=1 Hz, 1 H, SiH), 5.71 (dd, 4H, Cp), 6.52 (d, J=2 Hz, 4H, Cp).

The dimethylamido complex (3.80 g) was converted to the dichloride by reaction with an excess of trimethylchlorosilane in $CH_2Cl_2$ at room temperature overnight. The pale yellow solid was obtained in very high yield (3.53 g, 98%) following removal of the solvent. $^1$H NMR (250 MHz, $CDCl_3$, 25° C.): δ 0.86 (d, J=4 Hz, 3H, $SiCH_3$), 5.18 (q, J=1 Hz, 1H, SiH), 6.06 (dd, 4H, Cp), 6.98 (d, J=2 Hz, 4H, Op). $^{13}$C NMR (300 MHz, $CDCl_3$, 25° C.): δ −8.1, 105, 114, 115, 128, 129. IR (KBr pellet): 3110, 3085, 2184, 1834, 1695, 1643, 1448, 1400, 1369, 1361, 1325, 1262, 1205, 1170, 1066, 1054, 1049, 1039, 908, 883, 862, 817, 745, 678, 627 $cm^{-1}$. MS (EI) m/e 324 ($M^+$, $^{28}Si^{35}Cl_2^{90}Zr$). Elem. analysis calculated for $C_{11}H_{12}SiZrCl_2$: C, 39.51; H, 3.62. Found: C, 39.48; H, 3.65.

1.2 Synthesis of $Me(CH_2=CH)Si(Cp)_2ZrCl_2$ (3)

1.2.1 Preparation of $Me(CH_2=CH)Si(CpH)_2$ (4)

Methylvinyldichlorosilane (8.00 g, 56.8 mmol) in 50 mL of THF was cooled to −78° C. Cyclopentadienylsodium (9.98 g, 113.6 mmol) dissolved in 100 mL tetrahydrofuran was slowly added over a period of 3 hours. During the addition, a light yellow solution was obtained and LiCl precipitated. The solution was left to warm to room temperature with continuous stirring. The suspension was centrifuged and filtered. The final product was obtained as a viscous, clear yellow oil (9.98 g, 88%) as a mixture of four stereoisomers following removal of the solvents under reduced pressure. The compound was used without further purification in the next reaction. $^1$H NMR (250 MHz, $CDCl_3$, 25° C.): δ −0.20 (s, $SiCH_3$), 0.10 (d, J=4 Hz, $CH_3$), 0.309 (br, allylic CH of Cp ring), 3.22~3.76 (br, allylic $CH_2$ of Cp ring), 5.62~5.88 (m, $CH_2$ of the vinyl group), 5.90~6.24 (m, CH of the vinyl group), 6.63 (br, vinylic $CH_2$ of Cp ring) and 6.95 (br, vinylic CH of Cp ring).

1.1.2 Preparation of Me(CH$_2$=CH)SiCp$_2$ZrCl$_2$ via Amine Elimination

The ligand, CH$_2$=CHMeSi(CpH)$_2$ (5.00 g, 25.0 mmol), dissolved in 100 mL of toluene was cooled to −78° C. and then cannulaed into a solution of Zr(NMe$_2$)$_4$ (6.70 g, 25.0 mmol) in 80 mL of toluene at −78° C. within 5 minutes with vigorous stirring. The mixture was slowly warmed to ambient temperature (~3.5 hours) and stirred for an additional 3 hours, during which a color change was observed from light yellow to orange. The solvent was removed in vacuo with slight warming of the solution in a water bath (ca. 40–50° C.). The orange residue was transferred into the glovebox and 25 mL of hexane was added. The slurry was cooled to −35° C., filtered and washed with cold hexane. The second crop of pure complex was obtained from filtrate by reducing the volume under vacuum with total yield of 8.97 g (95%). $^1$H NMR (250 MHz, CDCl$_3$, 25° C.): δ 0.67 (s, 3H, SiCH$_3$), 2.75 (d, J=12.5 Hz, 6H, N(CH$_3$)$_2$), 5.83 (s, 4H, Cp), 6.12 6.56 (m, 3H, vinyl group) and 6.58 (s, 4H, Cp).

The dimethylamido complex (8.50 g, 22.5 mmol) was converted to the dichloride by reaction with an excess of trimethylchlorosilane in 150 mL CH$_2$Cl$_2$ at room temperature overnight. The slight yellow solid was obtained in high yield (7.55 g, 93%) following removal of the solvent. $^1$H NMR (250 MHz, CDCl$_3$, 25° C.): δ 0.78 (s, 3H, SiCH$_3$), 5.99(s, 4H, Cp), 6.23~6.56 (m, 3H, vinyl group) and 6.95 (d, J=9 Hz, 4H, Cp). 13C NMR (250 MHz, CDCl$_3$, 25° C.): δ −7.3, 112.9, 113.6, 115.5, 116.4, 126.2, 128.0, 128.1, 129.1, 130.8, 130.9, 138.3 and 138.5. MS (EI) m/e 358 (M$^+$, $^{28}$Si$^{35}$Cl$_2$$^{90}$Zr). Elem. analysis calculated for C$_{11}$H$_{12}$SiZrCl$_2$: C, 43.32; H, 3.91. Found: C, 43.38; H, 3.95.

1.3 Preparation of ClSiMe$_2$O(CH$_2$)$_{11}$Si(Me)Cp$_2$ZrCl$_2$ (5) and Cl$_2$SiMeO(CH$_2$)$_{11}$Si(Me)Cp$_2$ZrCl$_2$ (6)

1.3.1 Preparation of ClSiMe$_2$O(CH$_2$)$_9$CH=CH$_2$ (7)

To an excess of dimethyldichlorosilane (30 g, 23.0 mL) in 20 mL dichloromethane was added dropwise a solution of CH$_2$=CH(CH$_2$)$_8$CH$_2$OH (5.0 g, 29 mmol) in 50 mL CH$_2$Cl$_2$ at −78° C. over 3 hours. The reaction mixture was allowed to warm to room temperature over 4 hours and the final product was isolated by the removal of solvent under vacuum. $^1$H NMR (250 MHz, CDCl$_3$, 25° C.): δ 0.44 (s, 6H, Si(CH$_3$)$_2$), 1.27 (br, 12H, CH$_2$), 1.57 (m, 2H, OCH$_2$CH$_2$), 2.02 (m, 2H, CH$_2$CH=), 3.71 (t, J=6 Hz, 2H, OCH$_2$), 4.89 (dd, 2H, —CH=CH$_2$), 5.79 (m, 1H, —CH=CH$_2$). IR(KBr): 3077, 2926, 2865, 1641, 1456, 1259, 1096, 994, 910, 816, 658. MS (EI) m/e 262 (M$^+$, $^{16}$O$^{28}$Si$^{35}$Cl). Elem. analysis calculated for C$_{13}$H$_{27}$OSiCl: C, 59.39; H, 10.35. Found: C, 59.42; H, 10.45.

1.3.2 Preparation of ClSiMe$_2$O(CH$_2$)$_{11}$SiMeCl$_2$ZrCl$_2$ (5)

ClSiMe$_2$O(CH$_2$)$_9$CH=CH$_2$ (0.235 g, 0.89 mmol) and HMeSiCp$_2$ZrCl$_2$ (0.300 g, 0.89 mmol) were dissolved in 15 mL of methylene chloride. To this solution was added (Bu$_4$N)$_2$PtCl$_6$ (8 mg, 1 mol %). The mixture was stirred in a glovebox for 3 hours at room temperature and the final product was obtained by removal of the solvent in vacuo. $^1$H NMR (250 MHz, CDCl$_3$, 25° C.): δ 0.49 (s, 6H, OSi(CH$_3$)$_2$), 0.72 (s, 3H, HSiCH$_3$), 1.1~1.8 (br, 20H, 10×CH$_2$), 3.78 (t, J=6 Hz, 2H, OCH$_2$), 5.98 (pseudo t, J=2 Hz, 4H), 6.95 (dd, J=2 Hz, 4H). IR (KBr pellet): 3112, 3086, 2926, 2856, 1834, 1695, 1643, 1456, 1448, 1400, 1370, 1360, 1324, 1262, 1206, 1170, 1096, 1066, 1054, 1049, 1039, 817, 745, 678, 660 cm$^{-1}$. MS (EI) m/e 466 (M$^+$, $^{16}$O$^{28}$Si$^{35}$Cl$_2$$^{90}$Zr). Elem. analysis calculated for C$_{14}$H$_{31}$OSi$_2$Cl$_3$Zr: C, 35.84; H, 6.66. Found: C, 35.98; H, 6.65.

1.3.3 Preparation of Cl$_2$SiMeO(CH$_2$)$_{11}$SiMeCp$_2$ZrCl$_2$ (6)

The same procedure as reported above in 1.2.1 and 1.2.2 was followed with the following reagents: 10 equivalents of MeSiCl$_3$ (35.0 g, 235 mmol) and 4.00 g CH$_2$=CH(CH$_2$)$_8$CH$_2$OH (23.5 mmol); 0.422 g Cl$_2$SiMeO (CH$_2$)$_9$CH=CH$_2$, 0.500 g HMeSiCp$_2$ZrCl$_2$ (14.9 mmol) and 10 mg (Bu$_4$N)$_2$PtCl$_6$ (1 mol %). $^1$H NMR (250 MHz, CDCl$_3$, 25° C.) for the intermediate and final product, respectively: δ 0.78 (s, 3H, SiCl$_2$CH$_3$), 1.1~1.5 (br, 12H, 6×CH$_2$), 1.59 (m, 2H, OCH$_2$CH$_2$), 2.02 (q, 2H, CH$_2$CH=CH$_2$), 3.90 (t, J=6 Hz, 2H, OCH$_2$), 4.93 (dd, 2H, CH$_2$=CH), 5.80 (m, 1 H, CH$_2$=CH): δ 0.72 (s, 3H, SiCl$_2$CH$_3$), 0.79 (s, 3H, SiCH$_3$Cp$_2$), 1.1~1.8 (br, 20H, 10×CH$_2$), 3.90 (t, J=6 Hz, 2H, OCH$_2$), 6.00 (pseudo t, J=2 Hz, 4H, Cp), 6.97 (dd, 4H, Cp). IR (KBr pellet): 3114, 3086, 2927, 2856, 1836, 1698,1458, 1448, 1400, 1370, 1368, 1324, 1265, 1206, 1170, 1092, 1064, 1058, 1052, 1039, 817, 745, 678, 642 cm$^{-1}$. MS (EI) m/e 486 (M+, $^{16}$O$^{28}$Si$_2$$^{35}$Cl$_4$$^{90}$Zr). Elem. analysis calculated for Cl$_{13}$H$_{28}$OSi$_2$Cl$_4$Zr: C, 31.89; H, 5.76. Found: C, 31.80; H, 5.67.

1.3.4 Preparation of (EtO)$_3$Si(CH$_2$)$_2$SiMeCp$_2$ZrCl$_2$(8) and Cl$_3$Si(CH$_9$)$_2$SiMeCp$_2$ZrCl$_2$ (9)

(EtO)$_3$SiCH=CH$_2$ (0.508 g, 2.67 mmol) and HMeSiCp$_2$ZrCl$_2$ (0.300 g, 0.89 mmol) were dissolved in 15 mL of methylene chloride. To this solution was added (Bu$_4$N)$_2$PtCl$_6$ (6 mg, 1 mol %). The solution was stirred under nitrogen for 24 hours at room temperature and then the solvent and excess ethoxy silane were removed under vacuum. The residual solid was dissolved in toluene at room temperature and the solution was filtered to remove the small amount of insoluble platinum catalyst. The final pure product (EtO)$_3$Si(CH$_2$)$_2$SiMeCP$_2$ZrCl$_2$ (8) was obtained by removal of the solvent in vacuo, yielding 0.453 g (97%). $^1$H NMR (200 MHz, CDCl$_3$, 25° C.): δ 0.70 (s, 3H, SiCH$_3$), 0.76–0.85 (m, 4H, Si(CH$_2$)$_2$Si), 1.22 (t, J=7 Hz, 9H, CH$_3$CH$_2$O), 3.84 (q, J=7 Hz, 6H, CH$_3$CH$_2$O), 5.97 (pseudo t, J=2 Hz, 4H), 6.95 (dd, J=2 Hz, 4H). $^{13}$C NMR (300 MHz, CDCl$_3$, 25° C.): δ −7.8, 2.6, 18.4, 58.6, 109.0, 113.8, 115.1, 127.8, 129.2. IR (KBr pellet): 1166, 1089, 955, 823, 774, 684 cm$^{-1}$. MS (EI) m/e 524 (M$^+$, $^{16}$O$^{26}$Si$^{35}$Cl$^{90}$Zr).

The compound Cl$_3$Si(CH$_2$)$_2$SiMeCp$_2$ZrCl$_2$ (9) was obtained from Cl$_3$SiH (0.282 g, 2.08 mmol) and CH$_2$=CHMeSiCp$_2$ZrCl$_2$ (0.500 g, 1.387 mmol) in 15 mL of methylene chloride with (Bu$_4$N)$_2$PtCl$_6$ (8 mg, 1 mol %) under the same conditions, yielding 0.660 g (96%). $^1$H NMR (200 MHz, CDCl$_3$, 25° C.): δ 0.75 (s, 3H, SiCH$_3$), 1.23–1.63 (m, 4H, Si(CH$_2$)$_2$Si), 5.97 (pseudo t, J=2 Hz, 4H), 6.97 (m, J=2 Hz, 4H). $^{13}$C NMR (300 MHz, CDCl$_3$, 25° C.): δ −7.8, 2.7, 16.2, 107.4, 113.3, 115.4, 127.7, 129.8. IR (KBr pellet): 3102, 3068, 2892, 1705, 1453, 1401, 1364, 1322, 1259, 1203, 1168, 1148, 1067, 1052, 1040, 902, 877, 824, 785, 759, 741, 670, 651 cm$^{-1}$. MS (EI) m/e 493 (M$^+$, $^{28}$Si$^{35}$Cl$^{90}$Zr).

2. Preparation of Solid Catalysts

2.1 Solid Catalyst A (Preparation of a Supported Catalyst from a Functionalized Silica and a Metallocene Complex)

To a solution of 7 (0.885 g, 3.38 mmol) in 20 mL of CH$_2$Cl$_2$ was added 1.500 g PDS (1.95 mmol OH) at room temperature under nitrogen. The light brown solid was filtered after 20 hours and washed with CH$_2$Cl$_2$, and then dried in vacuo, yielding 1.783 g. No methane evolved during titration of the modified support with trimethylaluminum. It was further treated with excess trimethylchlorosilane in CH$_2$Cl$_2$ overnight. The carbon double bond determined by bromine/iodometric determination was 1.35 mmol/g silica, indicating complete reaction of the surface OH groups. Twenty mL of CH$_2$Cl$_2$ was added with stirring to a mixture of 1.030 g of the modified support, 0.310 g of 1 (0.742 mmol) and 10 mg of (Bu$_4$N)$_2$PtCl$_6$ (1.5 mol %). The mixture was stirred for 10 hours under nitrogen. The white isolated solid (1.094 g) was extracted overnight with excess $CH_2Cl_2$ and then dried in vacuo. Zirconium content by neutron activation analysis (NAA) was 0.79 weight %.

2.2 Solid Catalyst B (Preparation of a Supported Catalyst from a Functionalized Silica and a Metallocene Complex)

The same procedure as reported for solid catalyst A was followed with the following reagents:

Catalyst B: 1.500 g PDS (1.95 mmol OH) and 0.660 g diphenylvinylchlorosilane $CH_2$=$CHSiPh_2Cl$ (2.70 mmol), yielding 1.564 g modified support; Complex 1 (0.213 g, 0.64 mmol) and 1.135 g the support with 5 mg $(Bu_4N)_2PtCl_6$ (1 mol %). The isolated product (1.256 g) was a slightly brown solid. Zirconium content by NAA was 2.62 weight %.

2.3 Solid Catalyst C (Preparation of a Supported Catalyst from a Functionalized Silica and a Metallocene Complex)

To a $CH_2Cl_2$ solution (20 mL) of excess dimethylchlorosilane ($ClSiHMe_2$) was added 0.608 g PDS (0.79 mmol OH) at room temperature under nitrogen. The white solid was filtered after 18 hours and washed with $CH_2Cl_2$ and then dried in vacuo, yielding 0.663 g. No methane evolved during titration of the modified support with trimethylaluminum indicating all the hydroxyl groups had been consumed. Twenty mL of $CH_2Cl_2$ was added with stirring to a mixture of 0.500 g of the modified support, 0.154 g of 3 (0.46 mmol), and 6 mg of $(Bu_4N)_2PtCl_6$ (1.5 mol %). The mixture was stirred for 10 hours under nitrogen. The light yellow isolated solid was extracted overnight with excess $CH_2Cl_2$ and then dried in vacuo. Zirconium content by NAA was 2.42 weight %. The catalyst was further characterized by solid state, CP-MAS $^{13}C$-NMR. These studies were consistent with the expected formulation support —$OSiMe_2(CH_2CH_2)SiMe(Cp)_2ZrCl_2$ as revealed by the presence of signals due to SiMe and Cp carbons that were at the same or similar chemical shifts as those reported for metallocene 1, and $SiMe_2$ and $SiCH_2$ resonances were also observed.

2.4 Solid Catalyst D (Preparation of a Supported Metallocene Dimethyl Catalyst)

$MgMe_2$ (15 mg, 0.28 mmol) in 10 mL THF was added with vigorous stirring to the suspension of solid catalyst A (0.500 g) in THF (10 mL) at room temperature under nitrogen. The white solid was filtered after 15 minutes and washed with excess hexane to remove THF and then dried under vacuum. Zirconium content by NM was 0.69 weight %.

2.5 Solid Catalyst E and E' (Preparation of a Polystyrene Supported Metallocene Catalyst)

Twenty mL of $CH_2Cl_2$ was added with vigorous stirring to a mixture of 0.880 g cross-linked, polystyrene (containing 12 weight % divinylbenzene), 0.154 g 1 (0.46 mmol) and 10 mg $(Bu_4N)_2PtCl_6$ at room temperature under nitrogen. The light brown solid was filtered after 18 hours and washed with excess $CH_2Cl_2$ and then dried under vacuum to obtain solid catalyst E. The same procedure was followed for catalyst E' with the reagents: 0.409 g of polystyrene (50 weight % DVB), 0.170 g 1 (0.52 mmol) and 10 mg $(Bu_4N)_2PtCl_6$. Zirconium content by NM was 0.30 (E) and 0.27 (E') weight %.

3.0 Comparative Examples—Preparation of Supported Catalysts 3.1 Solid Catalyst F and F' (Preparation of a Supported Catalyst from a Metallocene Complex and MAO-Treated Silica According to U.S. Pat. Nos. 5,422,325 and 5,616,665 at Two Different Zr Loadings)

A slurry of $SiO_2$.MAO (0.345 g, 3.079 mmol of MAO) in toluene (10 mL) was prepared under nitrogen at room temperature. A solution of $Me_2SiCp_2ZrCl_2$ (0.149 g, 0.427 mmol) in toluene (15 mL) was freshly prepared and added to the slurry of the modified support. The mixture was stirred at room temperature for 12 hours and then filtered under nitrogen. The burgundy solid (0.389 g) was washed extensively with toluene until the filtrate was colorless. The zirconium content of solid catalyst F by NM was 3.45 weight %.

In a separate experiment, a similar procedure was employed using $Me_2SiCp_2ZrCl_2$ (0.019 g, 0.0544 mmol) and $SiO_2$.MAO (0.600 g, 5.34 mmol of MAO) in toluene (20 mL). The brown solid (0.603 g) was washed extensively with toluene until the filtrate was colorless. The zirconium content of catalyst F' by NM was 0.206 weight %.

3.2 Solid Catalyst G (Preparation of a Supported Catalyst by Reaction of Silica with an Unfunctionalized Metallocene Complex According to U.S. Pat. No. 4,701,432)

Twenty mL of $CH_2Cl_2$ was added with vigorous stirring to a mixture of 0.500 g (0.65 mmol OH) PDS and 0.217 g $Me_2SiCp_2ZrCl_2$ (0.65 mmol) at room temperature under nitrogen. The light brown solid 0.523 g was filtered after 10 hours and extracted with excess $CH_2Cl_2$ and then dried under vacuum. Zirconium content by NM was 1.46 weight %.

3.3 Solid Catalyst H and H' (Preparation of a "Tethered" Catalyst by Reaction of Silica with Metallocene Functionalized with a Silylating Agent According to U.S. Pat. No. 5,202,398)

0.400 g of PDS (0.52 mmol OH) was suspended in 10 mL of toluene. 0.35 g (0.667 mmol) of 8, dissolved in 10 mL of toluene, was added at 0° C. over 15 minutes. When the slurry had warmed to room temperature, it was stirred for a further 14 hours. The solid was separated off, washed three times with 10 mL of diethyl ether and dried in vacuo. The solid catalyst H was then extracted for 24 hours in a Soxhlet apparatus using toluene and subsequently dried under vacuum, yielding 0.456 g. Zr content 2.32 weight % by NM. The same procedure was followed for catalyst H' with the reagent: 0.500 g of PDS (0.65 mmol OH) and 0.400 g (0.808 mmol) of 9, yielding 0.471 g catalyst H with Zr content 2.50 weight %.

4.0 Polymerization Examples 4.1 Ethylene Polymerization with Supported or Soluble Catalysts A stirred, 1 L stainless steel autoclave reactor was charged with 500 mL of toluene or hexane. A desired amount of tri-iso-butylaluminum (TIBAL) or MAO (one third of the total amount, e.g. 0.12 g) in toluene or hexane was then added to the stirred reactor (500 rpm) via a pressurized stainless steel cylinder (50 mL) prior to heating to 70° C. At this point the reactor was saturated with ethylene under 75 psi which was supplied continuously to the reactor. The consumption of ethylene was measured by a calibrated mass-flow meter. The required weight of the solid catalyst or homogeneous catalyst was slurried/dissolved in toluene or hexane and mixed with the desired amount of MAO in toluene or hexane. The mixture was then added to the reactor via the same pressurized stainless steel cylinder to initiate the polymerization. After 30 minutes, the ethylene flow was stopped and the reactor was vented. The polymer was filtered off, washed with methanol, and then dried in vacuo to constant weight. The polymerization results are summarized in Table 1.

4.2 Ethylene Polymerization with Solid Catalyst D (Use of Single Component Cocatalysts)

The procedure of example 4.1 was followed using 10 mg of Catalyst D pre-contacted with $[Ph_3C][B(C_6F_5)_4]$ (4.2 mg) in toluene. The mixture was delivered to the reactor containing either 500 mL of toluene or 500 mL of hexane, pre-saturated with ethylene at 75 psig at 70° C. and containing 10 mg of TIBAL as a scavenger. After 10 minutes in toluene, 6.8 g of PE was formed for an activity of $54.4 \times 10^6$ g PE/mol Zr×h or 4.1 Kg PE/g catalyst×h. After 20 minutes in hexane, 6.2 g of PE was formed for an activity of $24.8 \times 10^6$ g PE/mol Zr×h or 1.9 Kg of PE/g catalyst×h.

4.3 Ethylene Polymerization with Solid Catalyst A (Use of Single Component Cocatalysts and In-situ Alkylation)

The procedure of example 4.1 was followed using 10 mg of Catalyst A pre-contacted with $Bu_2Mg$ (1.0 mg) and then $[Ph_3C][B(C_6F_5)_4]$ (4.2 mg) in toluene. The mixture was delivered to the reactor containing 500 mL of toluene, pre-saturated with ethylene at 75 psig at 70° C. and containing 10 mg of TIBAL as a scavenger. After 20 minutes in toluene, 9.8 g of PE was formed for an activity of $34.2 \times 10^6$ g PE/mol Zr×h or 2.9 Kg PE/g catalyst×h.

TABLE 1

| Entry | Cat.[b] | Amt.[c] | MAO[d] | S.[e] | $A_1^f$ | $A_2^g$ | Mn (K) | Mw/Mn |
|---|---|---|---|---|---|---|---|---|
| Ethylene Polymerization with Supported Zirconocene Catalysts and MAO[a] | | | | | | | | |
| 1 | A | 10(0.86) | I | T | 50.3 | 4.32 | 15.9 | 2.1 |
| 2 | A | 10(0.86) | I[h] | T | 74.1 | 6.36 | 9.6 | 2.7 |
| 3 | A | 10(0.86) | IP | H | 13.5 | 1.16 | 11.2 | 3.0 |
| 4 | B | 12(3.4) | I | T | 11.8 | 3.37 | 14.7 | 2.8 |
| 5 | C | 13(3.4) | I | T | 3.86 | 1.01 | 13.7 | 3.4 |
| 6 | Et | 59(1.7) | I | T | 9.12 | 1.58 | 12.8 | 3.2 |
| Comparative Examples (Supported Catalysts) | | | | | | | | |
| 1 | F | 10(3.8) | I | T | 10.4 | 7.84 | 8.2 | 2.9 |
| 2 | F' | 38(0.58) | I | T | 9.94 | 4.45 | 9.3 | 3.1 |
| 3 | G | 10(1.6) | I | T | 5.42 | 0.84 | 8.1 | 15.8 |
| 4 | H | 13(3.3) | I | T | 3.15 | 0.94 | 15.3 | 7.5 |
| 5 | H' | 13(3.6) | I | T | 5.56 | 1.20 | 9.6 | 8.6 |
| Comparative Examples (Soluble Catalysts) | | | | | | | | |
| 1 | M1 | (6.0) | I | T | 15.9 | — | 11.3 | 2.5 |
| 2 | M1 | (0.86) | I | T | 40.1 | — | 9.0 | 2.9 |
| 3 | M1 | (0.86) | I[h] | T | 55.0 | — | 8.0 | 2.8 |
| 4 | MI | (0.86) | IP | H | 11.4 | — | 13.7 | 3.1 |

[a]Polymerization conditions: Solvent (500 mL) containing MAO, Pre-saturated at 75 psi $C_2H_4$ and 70° C., 500 rpm using a 1000:1 Al:Zr ratio, except Where noted;
[b]For catalyst designation see experimental preparations: M1 = $Me_2SiCp_2ZrCl_2$;
[c]Amount of support used in mg, with μmol of Zr in parentheses;
[d]Cocatalyst used: I = PMAO, IP = PMAO-IP;
[e]Solvent used: T = toluene, H = hexane;
[f]Activity in $10^6$ g PE/mol Zr · h;
[g]Activity in Kg PE/g support · h; and
[h]Al:Zr 8000:1.

What is claimed is:

1. A supported tethered silyl bridged metallocene compound selected from the group consisting of compounds of the formula: )

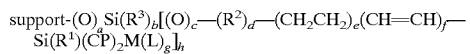

wherein the support is a support having reactive surface OH groups before reaction with the tether, M is selected from the group consisting of Ti, Hf and Zr, $R^1$ is selected from the group consisting of a $C_{1-4}$ alkyl radical and a phenyl radical which is unsubstituted or up to fully substituted by one or more $C_{1-4}$ alkyl radicals, $R^2$ is selected from the group consisting of a $C_{1-20}$ alkylene radical and a phenylene radical, $R^3$ is selected from the group consisting of a halogen atom, a $C_{1-4}$ alkyl radical, a $C_{1-4}$ alkoxy radical, a phenyl radical and an amino radical of the formula $N(R^4)_2$ wherein $R^4$ is a $C_{1-4}$ alkyl radical, a is an integer from 1 to 3, b is 0, 1, 2 or 3, and h is an integer from 1 to 3 and a+b+h=4 and if h is 1, then a+b=3 and a is 1 to 3, and if h is 2, a+b=2 and a is 1 or 2 and if h is 3, a=1 and b=0, c is 0 or 1 and d is 0 or 1 and if c =1, then d=1, e is 0 or 1, f is 0 or 1 and the sum of e+f=1, Cp is selected from the group consisting of cyclopentadienyl, indenyl and fluorenyl ligands which are unsubstituted or are up to fully substituted by one or more substituents selected from the group consisting of a $C_{1-4}$ alkyl radical, a phenyl radical or an amino radical which is substituted by two $C_{1-4}$alkyl radicals, said Cp radicals being joined by a bridge containing the Si atom bearing the radical $R^1$ each L is independently selected from the group consisting of a halogen atom, a $C_{1-4}$ alkyl group and a $C_{1-4}$ alkoxy group and the sum of 2+g is equal to the oxidation state of M; and compounds of the formula:

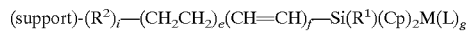

wherein the support is a polymer without surface hydroxyl groups and containing residual unsaturation and $R^1$, $R^2$, Cp, M, L, e, f and g are as defined above, e+f=1, and i is 0 or 1.

2. The compound according to claim 1 wherein $R^2$ is selected from the group consisting of a $C_{1-10}$ alkylene radical and a phenylene radical.

3. The compound according to claim 2 wherein the support is a silica support.

4. The compound according to claim wherein h is 1.

5. The compound according to claim 4, wherein a+b=3 and b=0, 1 or 2.

6. The compound according to claim 5, wherein c is 1.

7. The compound according to claim 6, wherein d is 1.

8. The compound according to claim 7, wherein e is 1.

9. The compound according to claim 8, wherein f is 1.

10. The compound according to claim 5, wherein C is 0.

11. The compound according to claim 10, wherein d is 1.

12. The compound according to claim 11, wherein e is 1.

13. The compound according to claim 11, wherein e is 1.

14. The compound according to claim 10, wherein d is 0.

15. The compound according to claim 14, wherein e is 1.

16. The compound according to claim 14, wherein e is 1.

17. The compound according to claim 2, wherein the support is a polymer without surface hydroxyl groups.

18. The compound according to claim 17, wherein $R^2$ is a $C_{1-10}$ alkylene radical or a phenylene radical.

19. The compound according to claim 18, wherein e is 1.

20. The compound according to claim 19, wherein f is 1.

21. A process for preparing a compound according to claim 1 comprising reacting either:

(a) a support selected from the group consisting of:

(i) supports containing reactive hydroxyl groups reacted with a tether precursor to give a structure of the formula:

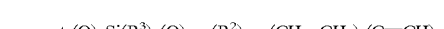

wherein $R^3$ is selected from the group consisting of a halogen atom, a $C_{1-4}$ alkyl radical, a $C_{1-4}$ alkoxy radical, a phenyl radical and an amino radical of the formula $N(R^4)_2$ wherein $R^4$ is a $C_{1-4}$ alkyl radical, a is an integer from 1 to 3, b is 0, 1, 2 or 3, and the sum of a+b=3, c is 0 or 1, $R^2$ is selected from the group consisting of a $C_{1-20}$ alkylene radical and a phenylene radical, e is 0 or 1, f is 0 or 1 and the sum of e+f=1, d is 0 or 1; and (ii) polymeric supports containing no hydroxyl groups but residual unsaturation with a structure of the formula:

$$(\text{support})\text{-}(R^2)_i\text{—}(CH=CH_2)_e(C\equiv CH)_f$$

wherein $R^2$, e and f are as defined above, e+f=1, and i is 0 or 1; with a bridged Ti, Hf, or Zr metallocene compound having the formula $(R^1)SiH(Cp)_2ML_g$ wherein M is selected from the group consisting of Ti, Hf and Zr, $R^1$ is a $C_{1-4}$ alkyl or a phenyl radical which is unsubstituted or substituted by up to four $C_{1-4}$ alkyl radicals, Cp is selected from the group consisting of cyclopentadienyl, indenyl and fluorenyl ligands which are unsubstituted or are up to fully substituted by one or more substituent selected from the group consisting of a $C_{1-4}$alkyl radical, a phenyl radical or an amino radical which is substituted by two $C_{1-4}$ alkyl radicals, L is independently selected from the group consisting of a halogen atom, a $C_{14}$ alkyl group and a $C_{1-4}$ alkoxy group and 2+g=the oxidation state of M or (b) a silyl bridged metallocene compound of the formula $$(CH_2=CH)_e(HC\equiv C)_f(R^2)_d Si(R^1)(CP)_2 ML_g$$

wherein M, $R^1$, $R^2$, Cp, L, d, e, f, and L are as defined above, and e+f=1 with a support containing surface SiH groups reactive with the terminal unsaturation of the pendant radical substituted on the bridging group of the metallocene compound; in an inert solvent at a temperature from 0° C. to 100° C., in the presence of a hydrosilylation catalyst in the amounts from 0.1 up to 10 mol % based on the molar amount of the unsupported metallocene.

22. The process according to claim 21, wherein process (a) is used.

23. The process according to claim 22, wherein the hydrosilylation catalyst is a complex of a transition metal selected from the group consisting of Ru, Os, Rh, Ir, Ni, Pd and Pt.

24. The process according to claim 23, wherein the support is silica.

25. The process according to claim 24, wherein c is 1.

26. The process according to claim 25, wherein d is 1.

27. The process according to claim 26, wherein e is 1.

28. The process according to claim 27, wherein f is 1.

29. The process according to claim 24, wherein c is 0.

30. The process according to claim 29, wherein d is 1.

31. The process according to claim 30, wherein e is 1.

32. The process according to claim 30, wherein f is 0.

33. The process according to claim 29, wherein d is 1.

34. The process according to claim 33, wherein e is 1.

35. The process according to claim 33, wherein f is 1.

36. The process according to claim 23, wherein the support is a polymer having no reactive surface hydroxyl groups.

37. The process according to claim 36, wherein $R^2$ is a $C_{1-20}$ alkylene radical or a phenylene radical.

38. The process according to claim 37, wherein i is 1.

39. The process according to claim 38, wherein e is 1.

40. The process according to claim 39, wherein f is 1.

41. The process according to claim 37, wherein i is 0 and e is 1.

42. The process according to claim 21, wherein process (b) is used.

43. The process according to claim 42, wherein the support is silica.

44. The process according to claim 43, wherein the support is silica that has been treated with a compound of the formula $(R^4)_j(Z)_k SiH$ wherein j+k=3, j is an integer and k=1, 2 or 3, $R^4$ is a $C_{1-4}$ alkyl or a phenyl radical which is unsubstituted or substituted by up to four $C_{1-4}$ alkyl radicals and Z is a halogen atom, a $C_{1-4}$ alkoxy group or the group $N(R^5)_2$ wherein $R^5$ is a $C_{1-4}$ alkyl group.

* * * * *